United States Patent
Yaklich

[15] 3,675,723
[45] July 11, 1972

[54] FURROW EXTENDING ATTACHMENTS FOR TRACTORS

[72] Inventor: John A. Yaklich, R. R. #1 Box 108, Avondale, Colo. 81022

[22] Filed: Nov. 2, 1970

[21] Appl. No.: 85,869

[52] U.S. Cl. ............................ 172/100, 172/102, 172/703, 172/742
[51] Int. Cl. .................................................. A01b 35/16
[58] Field of Search .................. 172/100, 102, 763, 753, 691, 172/687, 254, 702, 703, 742

[56] References Cited

UNITED STATES PATENTS

| | | | |
|---|---|---|---|
| 3,454,102 | 7/1969 | Beckley | 172/100 |
| 3,489,227 | 1/1970 | Martin | 172/100 |
| 2,823,814 | 2/1958 | Schonrock | 214/82 |
| 1,522,800 | 1/1925 | Bowman | 172/100 X |
| 557,822 | 4/1896 | Ingleton | 172/100 X |
| 2,327,937 | 8/1943 | Smith | 172/254 |
| 357,788 | 2/1887 | Root et al. | 172/742 |

Primary Examiner—Robert E. Pulfrey
Assistant Examiner—Clifford D. Crowder
Attorney—R. H. Galbreath

[57] ABSTRACT

An elongated frame bar is removably attached to the conventional implement drag bar or the rear cultivator bar of a tractor so as to successively align with the terminations of a plurality of parallel spaced-apart row irrigation furrows. A carriage, provided with a ditch forming plow, is mounted so as to be longitudinally moved back and forth along said frame bar by a roller chain propelled by a reversible motor so that the ditch forming plow will enter and extend the length of each row irrigation furrow as the frame bar successively aligns therewith.

2 Claims, 4 Drawing Figures

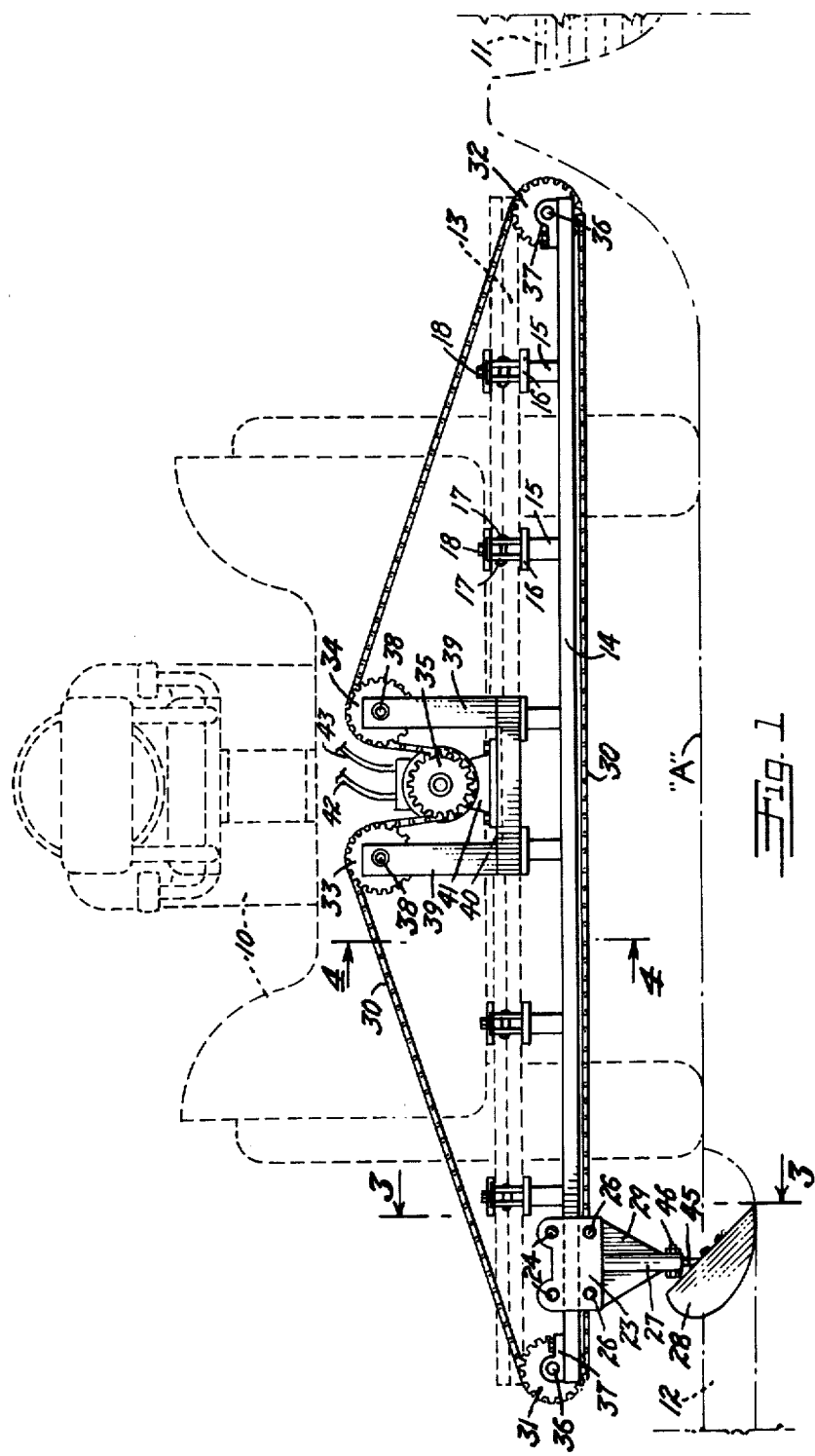

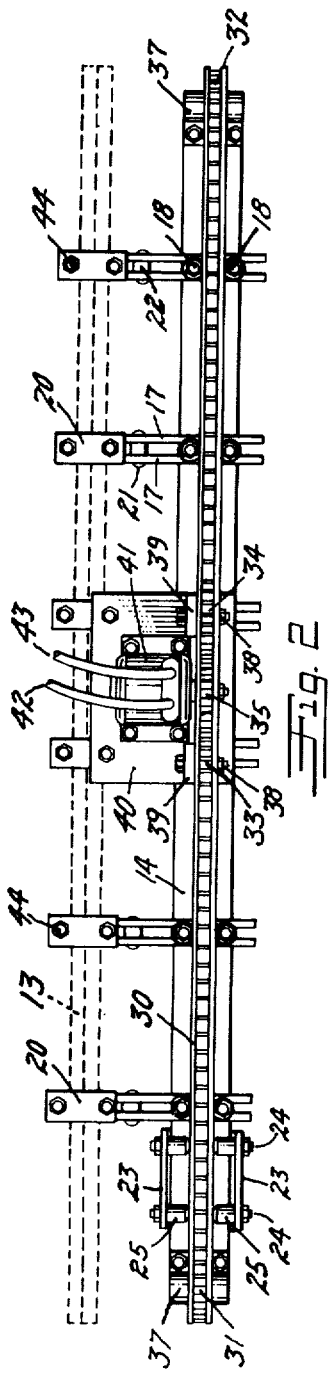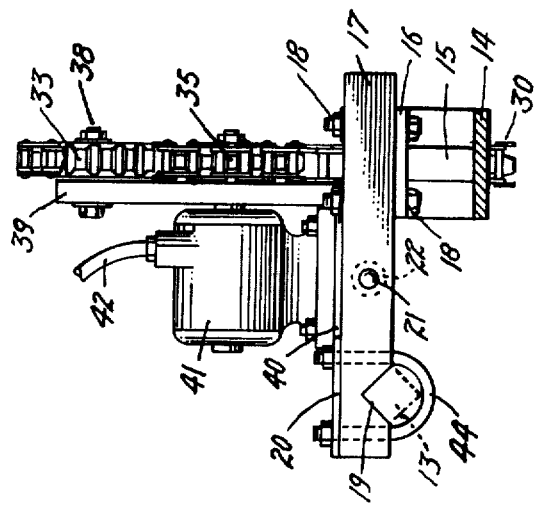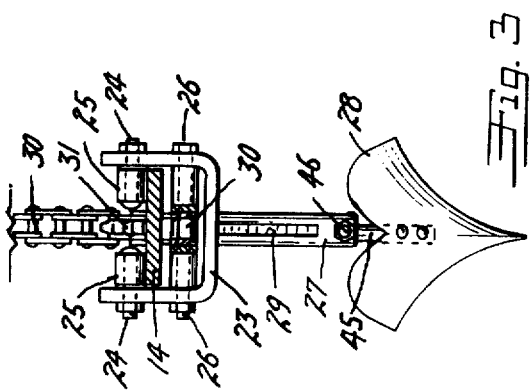

FURROW EXTENDING ATTACHMENTS FOR TRACTORS

This invention is primarily designed for use on ditch irrigated row crop farms upon which row ditches or irrigation furrows extend between and parallel to the rows to convey water from a main lateral ditch to the rows of plants. Since the planting plows and cultivators follow behind the tractors, it is impossible for the tractors to continue the plant rows and the irrigation furrows completely to the main lateral ditch. Therefore an unworked area, of 10 to 14 feet in width, will intervene between the lateral ditch and the ends of the parallel rows over which the irrigation furrows are customarily extended by hand for irrigation purposes.

The principal object of this invention is to provide a tractor attachment which will enable the tractor to be driven laterally of the irrigation furrows in the unworked area to individually extend the irrigation furrows into close proximity with a lateral main ditch so that water can be easily conveyed or siphoned directly from the lateral ditch into the furrows without the requirement of hand labor.

A further object is to provide a furrow extending attachment of the above type which can be quickly and easily and firmly attached to and detached from a conventional agricultural tractor which will be operable from and by the conventional tractor controls.

Other objects and advantages reside in the detail construction of the invention, which is designed for simplicity, economy and efficiency. These will become more apparent from the following description.

In the following detailed description of the invention, reference is made to the accompanying drawings which form a part hereof. Like numerals refer to like parts in all views of the drawings and throughout the description.

In the drawings:

FIG. 1 is a rear elevational view of the improved furrow extending attachment for tractors;

FIG. 2 is a top plan view of the attachment of FIG. 1;

FIG. 3 is an enlarged cross section taken on the line 3—3, FIG. 1; and

FIG. 4 is a similar enlarged cross sectional view taken on the line 4—4, FIG. 1.

In FIG. 1, the relative positions of a tractor 10, a lateral main ditch 11 and a row irrigation furrow 12 have been indicated in broken line. The "unworked area" is indicated at "A" in FIG. 1. It is conventional with agricultural tractors to provide a tool bar, to which various implements can be attached, and which is provided with hydraulic means which will enable the tool bar to be hydraulically raised and lowered under control of the tractor driver. Such a tool bar is shown in broken line at 13 in the drawings and will be hereinafter referred to as the cultivator bar 13. The present invention is designed to be attached to and supported by the cultivator bar 13 and will make use of the conventional hydraulic means of the tractor 10.

The invention comprises a flat, straight, elongated, horizontal frame bar 14 to which a plurality of structural pedestals 15 are welded so as to extend upwardly in medial, spaced-apart, longitudinal alignment. A flat rectangular, horizontal top plate 16 is welded to the top of each pedestal 15 and a pair of similar supporting arms 17 are clamped to each top plate, by means of suitable clamp bolts 18, and extend forwardly therefrom in parallel, spaced alignment. The forward portions of each pair of the arms 17 are notched, as shown at 19, to fit over the cultivator bar 13. The cultivator bar is clamped into the notch 19 by means of U-bolt 44 positioned between the arms of each pair and extending through a clamp plate 20 which engage both arms of each pair. The arms of each pair are maintained in spaced parallel relation by means of a spacer bolt or rivet 21 extending through a cylindrical spacer sleeve 22. Thus the frame bar 14 is fixedly supported by the conventional cultivator bar 13 and will be vertically movable simultaneously with and in correspondence with the conventional vertical movements of the cultivator bar 13.

A travelling carriage is arranged to travel longitudinally back and forth substantially the full length of the frame bar.

As illustrated, the carriage comprises a U-shaped carriage plate 23 which extends across the bottom of the frame bar 14 thence upwardly at each side thereof as shown in FIG. 3. Two roller bolts 24 extend inwardly from each of the upwardly extending sides of the U-shaped carriage plate each bolt rotatably carrying a roller 25 which rides upon the sides of the upper surface of the frame bar 14. The pair of rollers at one side are sufficiently spaced from the rollers at the other side to allow free passage by the medial pedestals 15 along the frame bar 14. A pair of spaced-apart attachment bolts 26 extend through and between the upwardly extending sides of the carriage plate 23 below the frame bar.

A vertical plow beam 27 is welded or otherwise medially affixed to the bottom of the carriage plate 23 and extends downwardly therefrom to support an inclined, ditch-forming plow share 28. The beam 27 is rigidly braced from the carriage plate 23 by means of triangular gusset plates 29. The plow share can be attached to the plow beam in any conventional removable manner.

The carriage assembly is propelled lengthwise of the frame bar by means of a conventional link-belt type of roller chain 30 the ends of which are respectively attached to the attachment bolts 26 of the carriage plate. The roller chain extends oppositely outward from the bolts 26 thence inward and upward over terminal idler sprockets 31 and 32 thence inward and downward over upper idler sprockets 33 and 34 into driving engagement beneath a drive sprocket 35. The terminal idler sprockets 31 and 32 are mounted on sprocket shafts 36 journalled in bearings 37 at the extremities of the frame bar 14. The upper idler sprockets 33 and 34 are mounted on sprocket shafts 38 journalled in supporting standards 39 which extend upwardly from opposite sides of a motor platform 40 which is supported on the supporting arms 17 midway of the length of the frame bar 14. The drive sprocket 35 is mounted on the shaft of a conventional reversible hydraulic motor 41 mounted upon the platform 40. The motor is hydraulically connected by means of suitable pressure hoses 42 and 43 to the hydraulic system of the tractor 10 so that the motor can be operated in either desired direction by the driver of the tractor.

OPERATION

The tractor is driven onto the "unworked" area "A" with the cultivator bar 13 elevated and parallel to the projected axes of the rows. When the plow share 28 aligns with the first irrigation furrow 12, the operator hydraulically lowers the cultivator bar, with his conventional hydraulic hitch mechanism, to cause the plow share 28 to enter the said first furrow. He then initiates his tractor hydraulic system so as to actuate the motor 41 to cause the roller chain to draw the plow share forwardly along the axis of the furrow to form a continuation thereof into close proximity with the lateral ditch 11. He then elevates the cultivator bar and its associated furrow-extending-assembly; reverses the motor to return the plow share to its initial position; and drives the tractor forward until the plow share aligns with the next irrigation furrow for a repetition of the above furrow-extending operation upon each successive irrigation furrow.

The tractor can, of course, be turned around, if desired, so that the plow share will first enter adjacent the lateral ditch 11 in alignment with the furrows and travel towards the latter to from the extensions thereon.

One of the principal uses has been described above but the identical assembly could be used to extend crop planting furrows into close proximity with fences, bridges, buildings, etc. so as to make use of various unworked spaces in a field. Since tractors are conventionally equipped with hydraulic systems, a hydraulic motor is ideal for use on this invention. However, the furrow extending could be accomplished with any type of reversible prime-mover.

It is preferred to form the plow beam 27 from a vertical length of pipe and to provide the share 28 with an upwardly extending bracket rod 45 which extends telescopically into the pipe length, as shown in FIG. 3, and which can be locked in the pipe by means of a suitable locking pin 46. This allows the plow share to be readily faced in either desired direction by simply removing the pin 46, rotating the bracket rod 180° and thence returning the pin to place. While a selected form of the invention has been above described, it is understood that mechanical variations and detail substitutions can be made by one skilled in the art without departing from the spirit of the invention.

Having thus described the invention what is claimed and desired to be secured by Letters Patent is:

1. In a furrowing attachment for a conventional farm tractor having a hydraulically controlled horizontal tool bar extending across the rear end thereof, the combination comprising, an elongated frame bar attached to said tool bar in fixed parallel relation, a traversing carriage element mounted on said frame bar for travel back and forth along said frame bar, said carriage including a substantially U-shaped carriage plate with its bight portion disposed beneath and its leg portions extending upwardly around the front and rear of said frame bar respectively, at least two roller members attached to said leg portions of said carriage plate with at least one roller member extending over said bar and one extending under said bar in rolling engagement therewith, an idler gear at each extremity of said frame bar, multi-directional drive means selectively connected to the engine of said tractor, a drive chain entrained around said frame bar and said idler gears and connected to said carriage and said multi-directional drive means to selectively drive said carriage back and forth along said tool bar, said drive chain including a carriage actuating portion and a separate drive engaging portion, a plow beam mounted on said carriage and extending downwardly therefrom, a vertically adjustable horizontally rotatable plow share carried by the lower extremity of said plow beam including means locking said bar to said beam in one of two selected horizontal positions thereon whereby said plow share may be employed to form a furrow when driven in either direction along said frame bar.

2. The furrowing attachment defined by claim 1 wherein said multi-directional drive means constitutes an independent fluid motor.

* * * * *